United States Patent
Fenning et al.

(10) Patent No.: US 12,009,784 B2
(45) Date of Patent: Jun. 11, 2024

(54) WATER REFLECTION ANALYSIS OF ENCAPSULATED PHOTOVOLTAIC MODULES

(71) Applicant: The Regents of the University of California, Oakland, CA (US)

(72) Inventors: David Fenning, Solana Beach, CA (US); Rishi Kumar, San Diego, CA (US); Guillaume von Gastrow, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 231 days.

(21) Appl. No.: 17/604,921

(22) PCT Filed: Apr. 28, 2020

(86) PCT No.: PCT/US2020/030279
§ 371 (c)(1),
(2) Date: Oct. 19, 2021

(87) PCT Pub. No.: WO2020/223234
PCT Pub. Date: Nov. 5, 2020

(65) Prior Publication Data
US 2022/0200526 A1 Jun. 23, 2022

Related U.S. Application Data

(60) Provisional application No. 62/860,925, filed on Jun. 13, 2019, provisional application No. 62/840,200, filed on Apr. 29, 2019.

(51) Int. Cl.
G01N 21/3554 (2014.01)
H02S 50/15 (2014.01)

(52) U.S. Cl.
CPC ......... *H02S 50/15* (2014.12); *G01N 21/3554* (2013.01); *G01N 2201/065* (2013.01)

(58) Field of Classification Search
CPC ................ H02S 50/15; G01N 21/3554; G01N 2201/065; G01N 2201/0632
See application file for complete search history.

(56) References Cited

U.S. PATENT DOCUMENTS

| | | |
|---|---|---|
| 8,606,342 B2 | 12/2013 | Diab |
| 9,588,058 B1 | 3/2017 | Bora et al. |
| 2012/0327207 A1 | 12/2012 | Oe et al. |

FOREIGN PATENT DOCUMENTS

WO 2015036754 A1 3/2015

OTHER PUBLICATIONS

Nagali et al., "Design of a diode-laser sensor to monitor water vapor in high-pressure combustion gases," Applied Optics, vol. 36, No. 36, pp. 9518-9527. (Year: 1997).*

(Continued)

*Primary Examiner* — Kiho Kim
(74) *Attorney, Agent, or Firm* — Greer, Burns & Crain, Ltd.; Steven P. Fallon

(57) ABSTRACT

A method for moisture testing of a fully assembled photovoltaic (PV) module. An assembled PV module is probed with short wave IR probe energy in the range of 1700-2000 nm. Energy reflected from the assembled PV module is collected and directed to a sensor. Noise is removed from a signal of the sensor with reference to the probe energy. Absorption is of the probe energy is determined. The absorption is correlated to moisture in the PV module. A preferred system that carries out the method provides a signal-to-noise ratio (as defined by standard deviation/mean of measured reflectance) of at least 3800.

14 Claims, 12 Drawing Sheets

(56) References Cited

OTHER PUBLICATIONS

Rashtchi et al., "Measurement of moisture content in photovoltaic panel encapsulants using spectroscopic optical coherence tomography: a feasiblility study", SPIE Solar Energy—Technology, vol. 8472, pp. 84720-0 to 84720-9 (Year: 2012).*

Von Lühmann et al., "Toward a Wireless Open Source Instrument: Functional Near-infrared Spectroscopy in Mobile Neuroergonomics and BCI Applications", Frontiers in Human Neuroscience, 2015, pp. 1-14, vol. 9, No. 617, CrossMark.

International Search Report and Written Opinion from the corresponding International Patent Application No. PCT/US2020/030279, dated Jul. 7, 2020.

\* cited by examiner

WATER REFLECTION ANALYSIS OF ENCAPSULATED PHOTOVOLTAIC MODULES

PRIORITY CLAIM AND REFERENCE TO RELATED APPLICATION

The application claims priority under 35 U.S.C. § 119 and all applicable statutes and treaties from prior U.S. provisional application Ser. No. 62/840,200, which was filed Apr. 29, 2019 and from prior U.S. provisional application Ser. No. 62/860,925, which was filed Jun. 13, 2019.

STATEMENT OF GOVERNMENT INTEREST

This invention was made with government support under grant no. EE-0008160 awarded by the Department of Energy. The government has certain rights in this invention.

FIELD

Fields of the invention include semiconductor fabrication and optoelectronic devices. Example applications of the invention include analysis of moisture in individual encapsulates and assembled encapsulated photovoltaic (PV) modules.

BACKGROUND

The ingress of water is implicated in interfacial instability that leads to various modes of PV module degradation, including delamination, reduced resistance to potential-induced degradation (PID), encapsulate degradation, and corrosion of contacts. Although water is involved in most long-term module degradation pathways, the inventors are not aware of any practical direct methods for observing moisture in existing photovoltaic modules. Moisture in modules is monitored primarily through performance degradation, where its involvement is not easily separated from the other rigors of field operation, such as UV dose and mechanical loading, limiting understanding of each mode of degradation that could enhance remediation efforts.

Humidity sensors within test modules have measured rates of moisture ingress (Ref 1), but such sensing cannot be conducted on already-installed modules or practically on a large fabrication scale. To probe changes in moisture in ethylene vinyl acetate (EVA) and silicone encapsulants individually, lab-based spectrophotometry has proven useful comparing before and after damp heat testing (Ref 2), which showed that exposure to damp heat leads to a change in near infrared absorption, but the low intensity of spectrophotometer sources limits their application in the field. Moisture in isolated materials has also been evaluated by Raman (Ref 3) and Fourier-transform infrared spectroscopy (FTIR) spectroscopy. In the interest of avoiding signal attenuation in glass and multiple module layers, coherence tomography FTIR has been proposed as a method to detect water in a full module (Ref 4). This frequency domain analysis provides no specific method to address problems inherent to encapsulated photovoltaic cells, which are designed to absorb and scatter incident radiation for the purpose of converting as much radiation as possible. Water remains a performance killer even in next-generation glass-glass modules: electroluminescence (EL) characterization clearly shows that water remains responsible for significant degradation (Ref. 5).

Fourier-transform infrared spectroscopy and infrared transmission measurements have been used to determine water content in solar encapsulants laminated between two glass sheets, yielding quantitative data on moisture capacity and diffusivity of various encapsulants. (Ref 6), (Ref 7). These transmission-based techniques are limited to use in test modules constructed without solar cells. While this method can imply the presence of water in degraded areas, it is unable to quantify the amount of water present in the module. Implanted humidity sensors have provided direct measurement of water content in test modules, though the invasive nature of this technique makes it untenable in fielded modules (Ref. 8). Additionally, the spatial resolution of module moisture measurement by humidity sensors is inherently low, as it is limited by the number of sensors implanted within the module. Finally, many previous studies of water in modules use finite-element models to simulate moisture ingress into modules under various environmental conditions (Ref 9), (Ref 10). Short-wave infrared (SWIR) has also recently been demonstrated for optoelectronic encapsulants that are isolated from operational modules (Ref 11).

SWIR reflectometry is commonly used to quantify moisture soil and food products (Ref. 12) (Ref 13). Water has a distinct absorption band in the SWIR region due to a linear combination of lower energy vibrational modes.

The SWIR techniques used in soil and food analysis, or those used to analyze encapsulates separately from modules are not directly transferable to PV module testing because PV modules are designed to absorb, scatter and convert incident radiation with minimal reflection. Practical tools for direct measurement of moisture in PV during normal operations remain unavailable.

REFERENCES (1) T. Carlsson, et al., "Moisture sensor at glass/polymer interface for monitoring of photovoltaic module encapsulants," Sensors Actuators A Phys. 125, 281 (2006).
(2) K. R. McIntosh et al., "The Effect of Accelerated Aging Tests on the Optical Properties of Silicon and EVA Encapsulants," in Proc. 24th Eur. PVSEC, Hamburg, Germany, 2009.
(3) C. Peike, et al., "Non-destructive degradation analysis of encapsulants in PV modules by Raman Spectroscopy," Sol. Energy Mater. Sol. Cells 95, 1686 (2011).
(4) S. Rashtchi, et al., in Proc. SPIE 8472, Reliab. Photovolt. Cells, Modul. Components, Syst. V, edited by N. G. Dhere and J. H. Wohlgemuth (2012), p. 847200.
(5) G. Cattaneo et al., "Lamination Process and Encapsulation Materials for Glass-Glass PV Module Design," Photovoltaics Int. Mar. 1-8 (2015).
(6) J. Kapur, K. Proost, C. A. Smith, and E. I. D. D. Nemours, "Determination of moisture ingress through various encapsulants in glass/glass laminates," in *Proc. Conf. Rec. IEEE Photovolt. Specialists Conf,* 2009, pp. 1210-1214.
(7) J. Hepp et al., "Infrared absorption imaging of water ingress into the encapsulation of (opto-)electronic devices," *IEEE J. Photovolt.*, vol. 9, no. 1, pp. 252-258, January 2019.
(8) T. Carlsson, P. Konttinen, U. Malm, and P. Lund, "Absorption and desorption of water in glass/ethylene-vinyl-acetate/glass laminates," *Polym. Testing*, vol. 25, no. 5, pp. 615-622, August 2006.

(9) M. D. Kempe, "Modeling of rates of moisture ingress into photovoltaic modules," *Sol. Energy Mater. Sol. Cells*, vol. 90, no. 16, pp. 2720-2738, 2006.

(10) P. Hülsmann and K.-A. A. Weiss, "Simulation of water ingress into PV-modules: IEC-Testing versus outdoor exposure," vol. 115, pp. 347-353, May 2015.

(11) B. G. Osborne, "Near-infrared spectroscopy in food analysis," in *Encyclopedia Analytical Chemistry*, Chichester, U.K.: John Wiley & Sons, October 2000, pp. 1-14.

(12) D. B. Lobell and G. P. Asner, "Moisture effects on soil reflectance," *Soil Sci. Soc. Amer. J.*, vol. 66, no. 3, pp. 722-727, 2002.

(13) G. E. Walrafen and E. Pugh, "Raman combinations and stretching over-tones from water, heavy water, and NaCl in water at shifts to ca. 7000 cm-1," *J. Sol. Chem.*, vol. 33, pp. 81-97, January 2004.

SUMMARY OF THE INVENTION

A preferred embodiment provides a method for moisture testing of a fully assembled photovoltaic (PV) module. An assembled PV module is probed with short wave IR probe energy in the range of 1700-2000 nm. Energy reflected from the assembled PV module is collected and directed to a sensor. Noise is removed from a signal of the sensor with reference to the probe. Absorption of the probe energy is determined. The absorption is correlated to moisture in the PV module.

A system of the invention includes a function generator to generate a pulsed reference signal. A pulsed light source responsive to the pulsed reference signal emits probe energy in the range of 1700-2000 nm. Optics direct the probe energy upon the assembled PV module. Optics collect reflected energy from the assembled PV module. A sensor receives collected reflected energy. A lock-in amplifier locked to the pulsed reference signal attenuates noise in the collected reflected energy. Electronic analysis correlates absorption of the probe energy to moisture.

DETAILED DESCRIPTION OF THE PREFERRED EMBODIMENTS

Figures 1A, 1B:
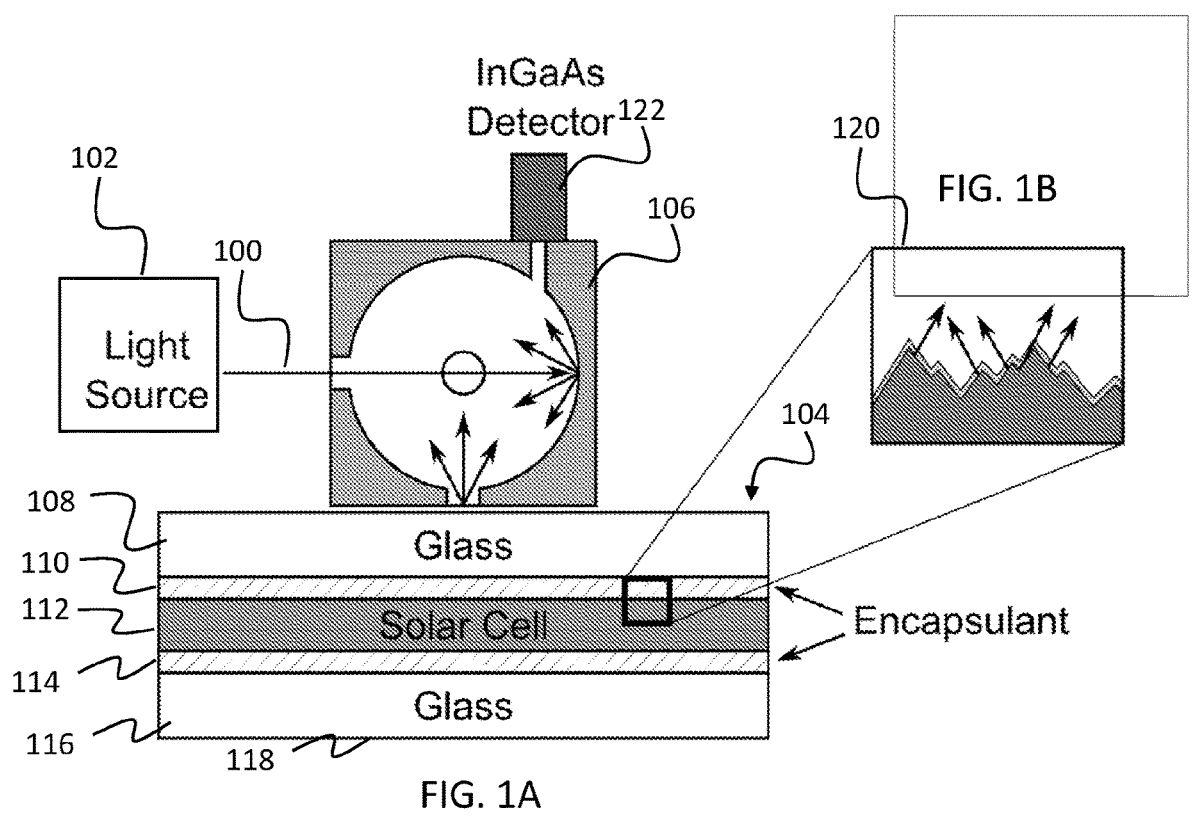
FIG. 1A is a schematic diagram illustrating a preferred method and system for water reflective mapping of moisture content in an encapsulated photovoltaic module.
FIG. 1B is an expanded view of a portion of the encapsulate/solar cell interface of the encapsulated photovoltaic module of FIG. 1A.

Preferred embodiments of the invention provide an optical water reflectometry method for moisture analysis using an SWIR laser source that passes through encapsulated module layers of a complete photovoltaic module and its reflection is detected. Preferred methods and systems overcome the light-absorbance/trapping properties of a fully assembled encapsulated photovoltaic module to conduct SWIR reflectometry absorption measurements that can be related to moisture content in the cell, and particularly with its interaction with the encapsulate. Water reflectometry mapping of the invention can map water content in encapsulated PV modules with high spatial resolution, informing both bottom-up modeling and top-down studies of PV component degradation. This non-contact measurement method for quantifying water content in fully assembled PV modules is arbitrarily scalable, enabling quantification across length scales in quality control for manufacturing or in the field.

Preferred methods leverage the unique IR signature of moisture inclusion in the encapsulate, which allows use of changes in IR absorbance that modify reflectance to measure local water content. Such water reflectometry mapping/imaging provides a low-cost, retina-safe method to monitor and analyze water ingress in PV modules in the lab, in quality control during manufacture, and in the field. The ability to quantify water content and distribution as a function of environmental condition can be crucial to establishing prediction of PV module degradation. Preferred systems of the invention include diffraction limited optics that achieve spatially resolved measurement of moisture content down to the wavelength of light used (1200-1500 nm). Multicolor laser diode modules are used in preferred embodiments to increase sensitivity to water absorption relative to other factors. IR imaging camera technologies such as SWIR InGaAs cameras can be used to produce reflectance images over large fields of view simultaneously, or linear arrays can be used in inline production manufacturing to scan samples on the fly for moisture quality control.

Preferred methods provide (1) techniques for the in-situ characterization of moisture in the module, and (2) complementary modeling of the ingress of water and its detrimental impact at interfaces in PV modules using experimental data acquired in controlled moisture and heat environments to validate the model. Systems of the invention provide outputs including (1) spatial analysis of the water content in a module with micron-scale resolution, (2) analysis that provides fundamental understanding of the progression of degradation due to water at interfaces in the module, and (3) a continuum model of the distribution of water in the module as a function of time and temperature, enabling prediction of future module performance.

Methods of the invention provide a spatially-resolved infrared (IR) reflectometry measurement to detect and quantify where water is in PV modules. Methods of the invention can be used to test manufactured PV modules and can also be used to test operating PV modules in the field. The spatial distribution of water is quantitatively assessed in conjunction with local cell and module impacts, enabling a parsing of cell degradation mechanisms. Preferred methods can provide pair atomistic and first-principles modeling of interfacial and defect phenomena with detailed experimental micro-characterization.

Preferred methods provide a calibrated water reflectometry detection model for SWIR determination of water content in both aluminum back surface field (Al-BSF) and passivated emitter rear contact (PERC) modules. Validation of the detection model is based on reflectance data from miniature modules exposed to environments ranging from room condition to the standard 85° C., 85% relative humidity (RH) accelerated test condition.

Preferred embodiments of the invention will now be discussed with respect to the drawings and experiments used to demonstrate the invention. The drawings may include schematic representations, which will be understood by artisans in view of the general knowledge in the art and the description that follows.

Figure 1C:
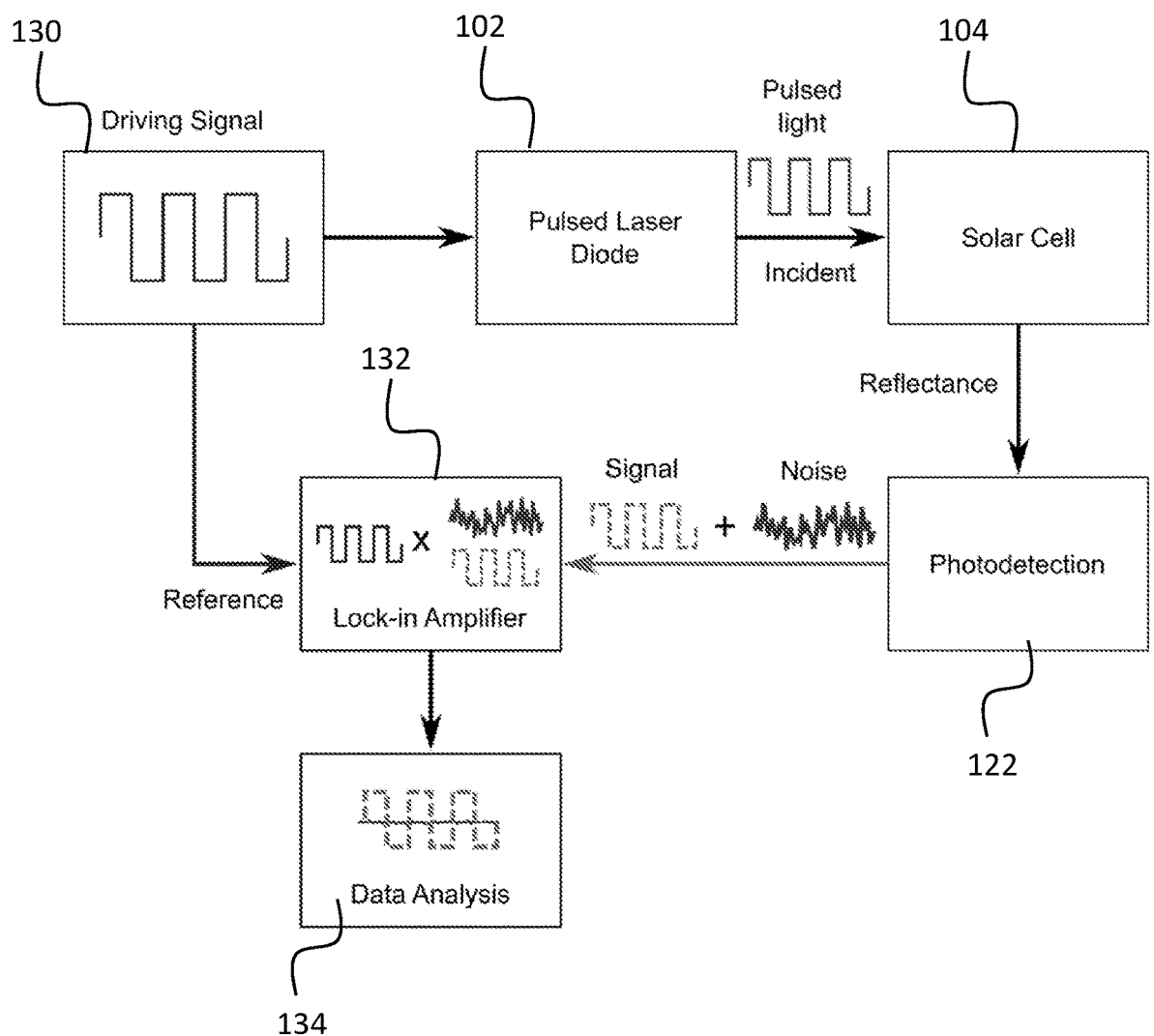
FIG. 1C is a schematic diagram of a preferred control system for the FIG. 1A system for water reflective mapping.

A preferred method and system are shown in FIGS. 1A-1C. Short-wave IR radiation 100 from an IR light source 102 is directed toward a PV module 104 via an integrating sphere 106. The SWIR radiation penetrates a front glass 108 and continues through a front EVA encapsulation layer 110 and a silicon sensor cell 112 layer. The sensor cell 112 typically includes a reflective back surface mirror that is a good reflector of the radiation in the 1700-2000 nm range of interest. A back surface metallic contact or a high-k dielectric layer, for example, both provide good reflectivity and serve as back surface mirror. The solar cell 104 includes a back EVA encapsulation layer 114 and a back glass layer 116, which typically includes a bottom mirrored surface 118 and reflects any SWIR radiation back that passed through the solar cell 112. The SWIR radiation 100 in the 1700-2000 nm sits between the more frequently studied visible/near IR and the spectroscopic bands at multiple-micron wavelengths. Reflected radiation provides an IR signature of moisture inclusion in the PV module, which can be determined through changes in IR absorbance that modify reflectance to measure local water content.

FIG. 1B illustrates an interface 120 of the solar cell with the front encapsulation layer 110. The interface 120 is textured. By design, solar cells in PV modules have such a textured front surface which captures almost all incident light with wavelengths within the visible portion of the spectrum. This light-trapping features have also the effect of scattering incident light in different directions as opposed to what would be expected if light reflects from a flat surface. Light scattered from the surface of solar cells has then lower amount of specular reflection and a larger component of diffuse reflection. The preferred system uses the integrating sphere 106 to maximize the capture of reflected light provided back to a sensor, such an InGaAs sensor 122. Alternative collection devices can be used instead of the integrating sphere 106 to ensure sufficient reflected light collection. Suitable alternatives to the integrating sphere 106 include ellipsoidal or parabolic collecting optics, e.g. Al or Au-coating collecting optics. A high numerical aperture collective lens is another alternative for the collecting optics.

The light source 102 provides a narrow band for the radiation 100 in the infrared portion of the electromagnetic spectrum in the range of 1700 to 2000 nm. FIG. 1C shows the preferred driving and sensing portion of the FIG. 1A system, which provides a good signal-to-noise ratio. A reference/driving signal provided by a function generator 130 is pulsed and drives the light source 102, e.g., a laser diode, to pulsed excitation. This interacts with the solar cell 104 as discussed with respect to FIG. 1A. The reflectance signal is measured by the sensor 122 and fed to a lock-in amplifier 132, where it is multiplied by the reference/driving signal 130 to attenuate the noise and signal components at other frequencies. The measurement can be considered either in the time-or the frequency-domain, but is preferably analyzed in the frequency domain approach. When computer 134 conducts measurement in the frequency domain, the analysis is simplified and accurate because only one wavelength/frequency is varied at a time. This is a significant advantage compared to prior Fourier transform infrared measurements, because those approaches use a broadband source that creates a time-domain interferogram, which requires a Fourier transform to obtain the measured spectrum and can introduce noise. The lock-in amplification approach of FIG. 1C permits to extract signals that are orders of magnitude smaller than the noise, and therefore allows very sensitive detection of water in the encapsulated PV module.

Pulsing the light source 102 at a fixed frequency using the function generator 130 helps to increase the signal-to-noise ratio. The photodetector 122 transduces the incoming light into a current signal that contains a noise component at random frequencies and phases. Because the signal is then fed to the lock-in amplifier 132 and is multiplied by the reference signal, this attenuates noise signals. The reflectance signal is integrated against the reference signal of the laser pulse. Over long times, any signal that is out of phase (including any noise not at the frequency of interest) is averaged out to zero in the lock-in technique of FIG. 1C. The reflection detection is only sensitive to precisely the frequencies that match the narrow probe laser pulse (called locked-in) that do not match the frequency of the pulsed reference signal. In order to determine the content of water from reflectance measurements, the intensity of the reflectance is measured for a selection of individual wavelengths with a narrow pass (less than 5 nm) between the range of 1700 to 2000 nm. The narrow probe beam can be created from various sources, as demonstrated experimentally. In one set of experiments, a spectrophotometer with a broadband IR light source was coupled to a monochromator to achieve a narrowband. This approach provided relatively weak irradiation of a sample PV module with a spot size limited by the aperture and the low light intensity to about 1 cm. A preferred approach was demonstrated with a tunable IR laser, with ~10-100× the light intensity at each wavelength compared to the broadband IR light source, and this was paired this with a lock-in-amplification to improve detection limits, as discussed with respect to FIG. 1C. Since the method collects scattered light from the textured surface of the solar panel, it does not rely upon phase coherence information. Such information is extremely difficult to extract from the diffuse component of the reflectance.

The light source 102 in preferred embodiments is a distributed feedback diode light source, and preferably includes an external cavity laser diode that can be used to tune the light source wavelength around the predetermined SWIR wavelengths of interest. An alternative setup would use an infrared diode array in combination with notch pass filters for the light source 102 to tune the wavelength of the light source 102. The selected range of the spectrum is important to minimize signal losses due to absorption in the front glass 108, as many glasses strongly absorb in the infrared spectrum at wavelengths larger than 2000 nm.

Generally, experiments showed that dried EVA indicates sensitivity to moisture ingress only in the IR region >1100 nm and the spectral isolation of water signal extends to the ~1900 nm range, which provides a wavelength range of ~1100 nm-~1900 nm for the SWIR radiation 100. Experiments showed that the highest moisture sensitivity is in the 1700-2000 nm spectral range, which is therefore the preferred range for the SWIR radiation 100. Unlike in the visible and UV, the front glass 108, EVA encapsulation 110 and dielectrics and silicon in the solar cell 112 are largely transparent to 1700-2000 nm light. On the other hand, an aluminum back contact or dielectric of the solar cell 112 acts as a very good IR mirror.

Experiments were conducted to determine water content in moisture-exposed PV modules. The experiments first parametrized the diffusivity and solubility of water in contemporary encapsulants. Then miniature PV modules were tested through exposure to various damp heat conditions until the encapsulant moisture content reaches saturation. The front-side module reflectance in the wavelength range of 1700-2000 nm is taken of samples at each saturation condition. This dataset was used to form an empirical relationship between encapsulant water content and module reflectance and was demonstrated to match the expected relationship theoretically based on water's infrared absorption. The resulting calibration curve enables module water content measurement with a detection limit of 0.066 mg/cm$^3$ and a prediction error of 0.130 mg/cm$^3$. In the case of EVA encapsulant, this detection limit corresponds to extremely dry climates ranging from 4% to 6% RH at temperatures between 25-40° C. Experiments shows that a saturated 450 μm EVA film holds moisture roughly equivalent to a 1.35 μm film of water.

EXPERIMENTAL

Diffusivity and Solubility of Water in Encapsulants

Parameterization of the diffusivity achieved by a gravimetric study of water uptake in 2.3-mm-thick cured encapsulant samples formed by vacuum lamination of multiple encapsulant sheets under standard conditions (1 atm at 145° C.). Two commercial encapsulants were tested-3M EVA9100 ethylene vinyl acetate (EVA), and Cybrid POE-T polyolefin (POE). Samples were saturated in varied temperature and RH conditions, controlled by either an environmental test chamber or a water bath. Samples were periodically removed from the environment, cooled to room temperature, dried, and weighed. Mass changes incurred due to water uptake as a function of time were fit to determine the diffusivity and solubility of water in the cured encapsulant according to Equation (1) is a 1-D slab diffusion model describing the water concentration C at $$C(x,t) = C_s - \frac{4C_s}{\pi}\sum_{m=0}^{\infty}\frac{1}{2m+1}\sin\frac{(2m+1)\pi x}{l}e^{\left(-\frac{D(2m+1)^2\pi^2 t}{l^2}\right)} \quad (1)$$

depth x within the slab at time t assuming no initial concentration of water in the encapsulant, equilibrium water concentration $C_s$ at the faces of the encapsulant sheet in the bath, encapsulant layer thickness of $l_{ene}$, and negligible diffusion from the edges (thickness <<width). Solubility was calculated by the mass increase between the dry and saturated encapsulant samples.

Optical Testing.

SWIR reflectance measurements were performed on miniature (3 by 3 cm) EVA9100-encapsulated modules with either PERC or Al-BSF cell architectures. Two module structures were used. One "mini-modules" followed the typical module structure with a top glass layer (borosilicate glass purchased from McMaster-Carr) and a bottom backsheet layer (Protekt HD purchased from. Madico). Another "open-face modules," with no top glass (the top encapsulant layer is exposed) and a bottom glass layer. All samples were measured at states of various water content. The equilibrium water content in the encapsulant is dependent on the partial pressure of water vapor, which was controlled by, environmental temperature and relative humidity. First, a vacuum oven was used to fully remove water from modules. Environmental test chambers were employed to control the damp heat conditions for saturation of our miniature modules. Tested environmental conditions ranged from 23 to 85° C. and 0% to 85% RH. Samples were kept in the environmental chambers until reaching at least 99.5% saturation water content as determined by (1) using our parametrized diffusivity values shown in Table I

TABLE I

PARAMETERS FOR WATER DIFFUSIVITY AND SOLUBILITY IN SOLAR ENCAPSULANTS

| | Cybrid POE-T | 3M EVA9100 | EVA from 2005 [17] |
|---|---|---|---|
| $E_a$ (eV) | 0.03 ± 0.25 | 0.19 ± 0.08 | 0.40 ± 0.05 |
| $D_o$ (cm$^2$/s) | 4.9 × 10$^{-6}$ ± 1.2 × 10$^{-4}$ | 1.3 × 10$^{-3}$ ± 6.2 × 10$^{-2}$ | 2.5 ± 1.9 × 10$^{-1}$ |
| $\Delta H_{sol}$ (eV) | 0.11 ± 0.02 | 0.19 ± 0.02 | 0.17 ± 0.03 |
| $C_o$ (g/cm$^3$) | 0.03 ± 0.50 | 2.23 ± 0.50 | 1.61 ± 0.29 |

Reflectance was measured on a Perkin Elmer. Lambda 1050 spectrophotometer using a 150-mm Spectralon integrating sphere and a Spectralon reflectance standard. Samples were oriented such that the beam is incident upon the top glass and is normal to the sample surface. Sample reflectance was measured at both room temperature and the temperature used during damp heat exposure. The elevated temperature was employed to avoid observed optical effects from condensation of water within the module as described below. Additional SWIR reflectance and transmission measurements were made of the individual module components. The absorbance of EVA was determined at various temperatures via reflectance measurement of an EVA9100 film laminated onto an aluminum mirror. Finally, SWIR reflectance measurements of 3M EVA9100, Cybrid POE-T, and 3M EVA9110 (another commercial EVA solar encapsulant) laminated on mirrors were taken at vacuum dry and 85° C. 85% RH saturated conditions as a proof of concept for WaRD in other encapsulants.

Diffusivity and Solubility of Water in Encapsulant.

Figure 2A:
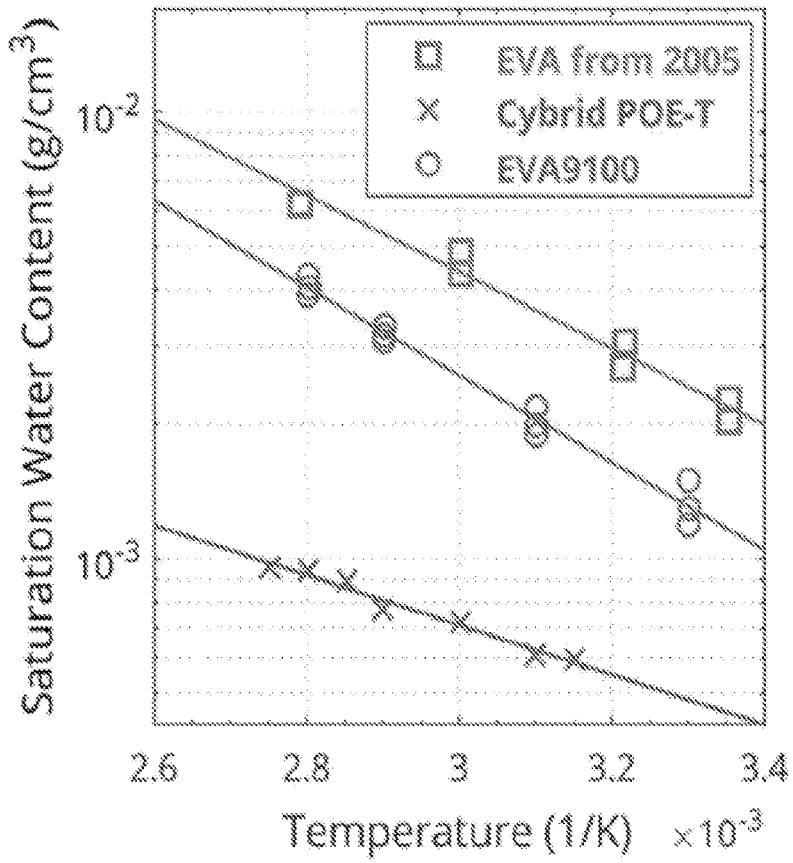
FIG. 2A is encapsulate solubility data and FIG. 2B diffusivity data of water in EVA9100, Cybrid POE-T$_5$ and an EVA formulation from 2005.
Figure 2B:
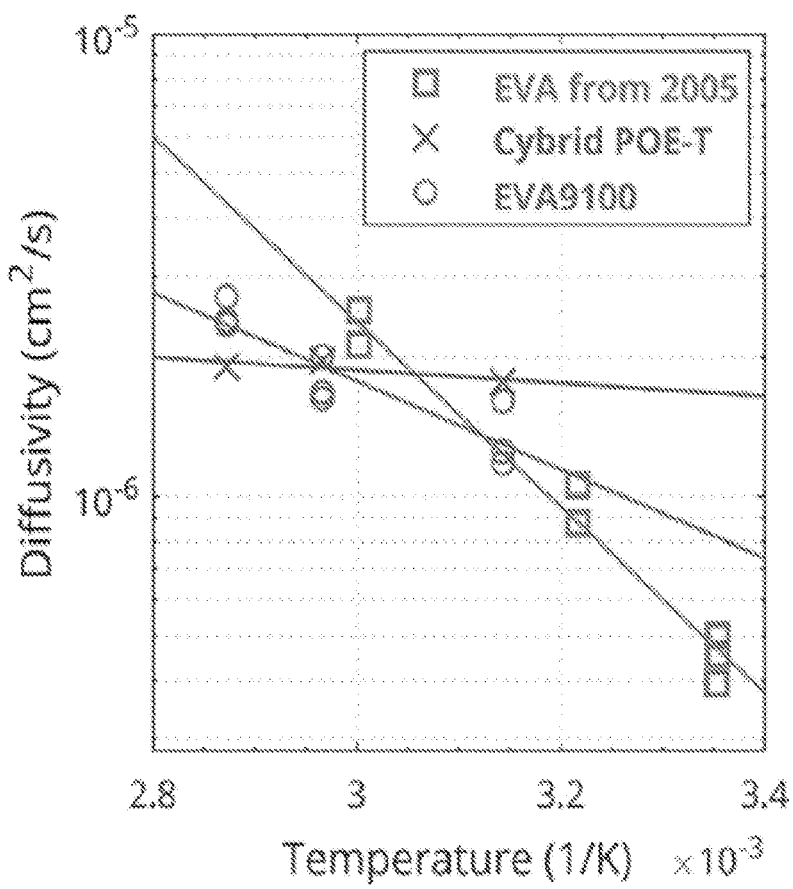

Measurements for the diffusivity and solubility of water in contemporary EVA are compared to those from previously published work testing 2005 era EVA. FIG. 2A is encapsulate solubility data and FIG. 2B diffusivity data of water in EVA9100, Cybrid POE-T, and an EVA formulation from 2005. For the EVA 2005, see M. D. Kempe, "Control of moisture ingress into photovoltaic modules," in *Proc. 31st IEEE Photovolt Specialists Conf.*, 2005, pp. 503-506.

The diffusivity and solubility values for EVA from 2005 are obtained by fitting extracted data points. EVA9100 holds about 40% less water than EVA of 2005, but has a slightly higher solvation enthalpy. Water diffusivity is higher in contemporary EVA for temperatures below 50° C. As expected, water solubility is found to be lower in POE than in EVA reflecting the difference in polymer chemistries. EVA contains polar vinyl acetate groups, whereas POE consists entirely of nonpolar hydrocarbon chains. Water shows higher diffusivity in POE compared to all EVA formulations for temperatures below 60° C. Fitted Arrhenius parameters for water diffusivity ($D=D_o e^{-E_a/kT}$) and solubility ($C=C_o e^{-\Delta H}$ sol/kT) in these materials are given in Table I.

Spectral Analysis.

Absorbance was checked in a front-side total reflectance measurement between 250 and 2300 nm. The silicon cell shows strong absorbance in the visible region, while the top glass shows strong absorbance in the ultraviolet and infrared regions. The encapsulant itself (EVA9100), has pronounced absorption features in the 1200-2200 nm region. Liquid water has two absorption features in this optical region, located at 1450 and 1940 nm. In the case of water contained within EVA, we observe a water absorption feature at 1902 nm. Transmission measurements of module components show that no light in the 250-2300 nm optical region is transmitted through either a PERC or Al-BSF cell. This implies that any incident light not reflected back to the integrating sphere has been absorbed within the module. A front-side module reflectance measurement, therefore, is equivalent to a transmission measurement making two passes through the glass, top encapsulant layer, and silicon absorber, enabling the conversion of reflected intensity (R) to absorbance (A) by Beer-Lambert's law (A=log(R)).

Absorption features of water and the encapsulant indicated by reduced reflectance intensity are isolated from any broadband optical features by baseline subtraction. These broadband optical features—namely, those from absorbance in the glass, absorbance in the cell, and refractive index mismatch at interfaces—are essentially flat in the 1700-2000 nm range.

Figure 3A:
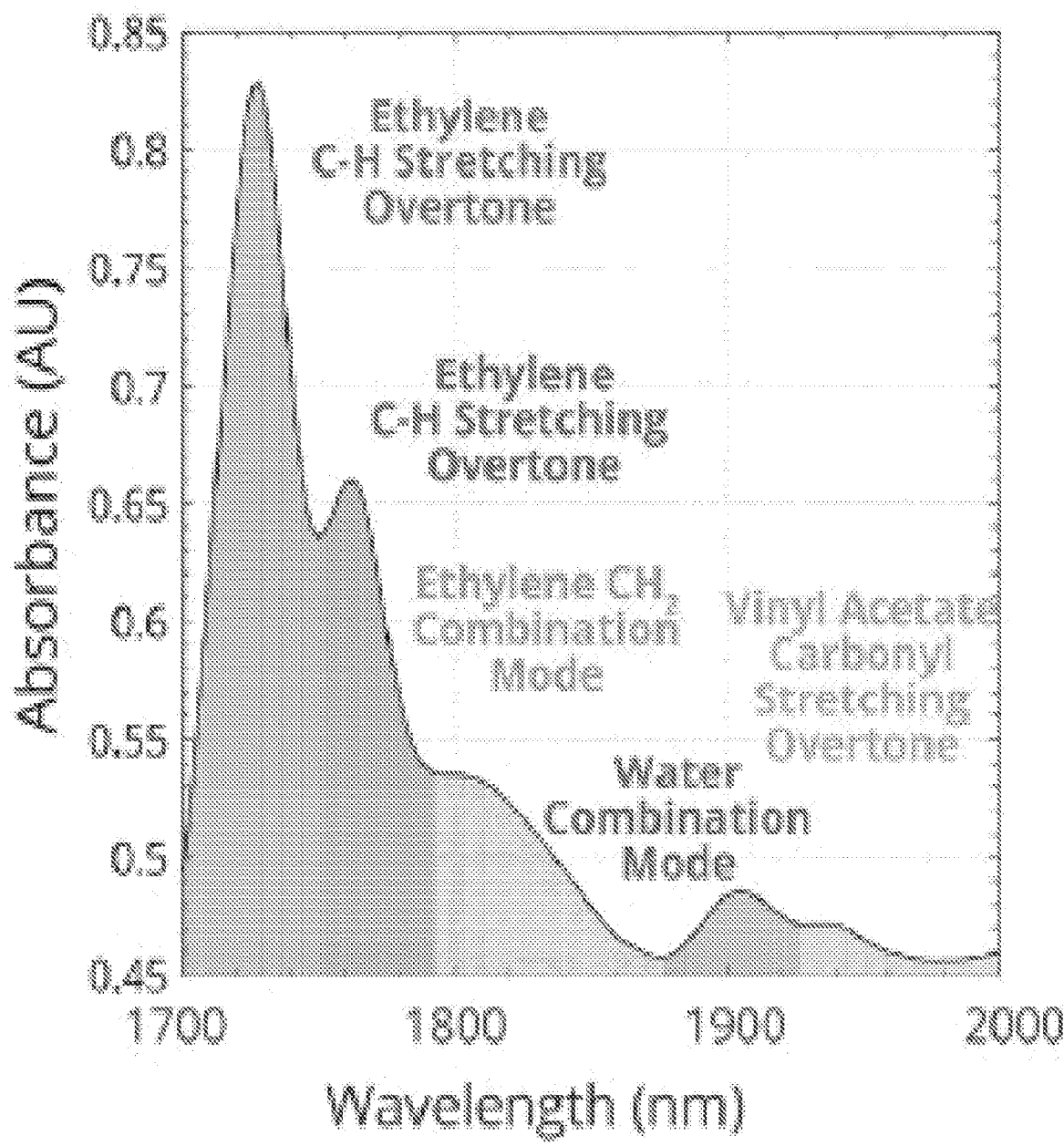
FIG. 3A is data of water and EVA absorption features of interest in a module containing water.
Figure 3B:
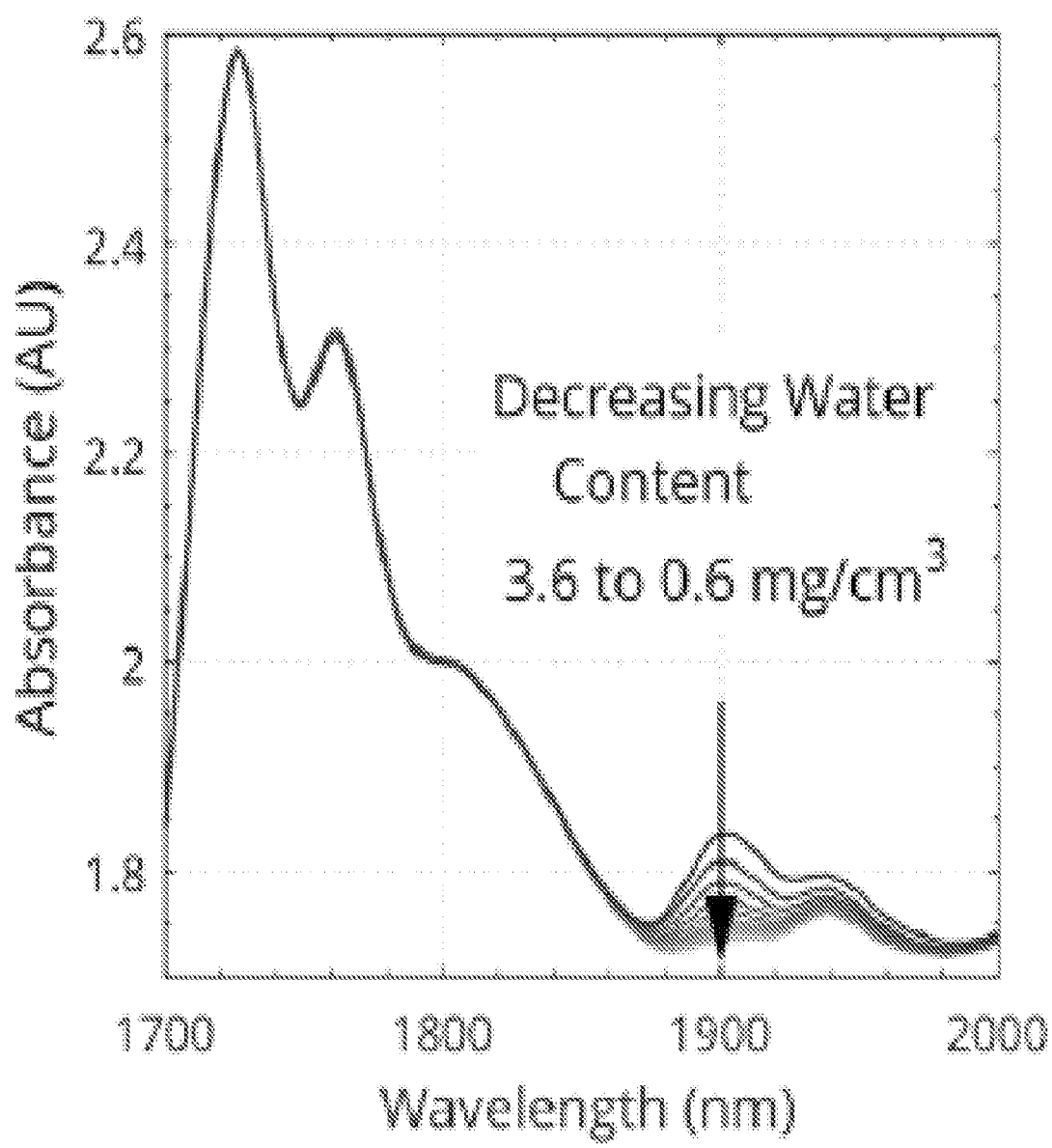
FIG. 3B is the absorption spectra of an EVA9100-laminated "open-face" PERC module previously saturated with water at 85° C. 85% RH equilibrating to room conditions.
Figure 3C:
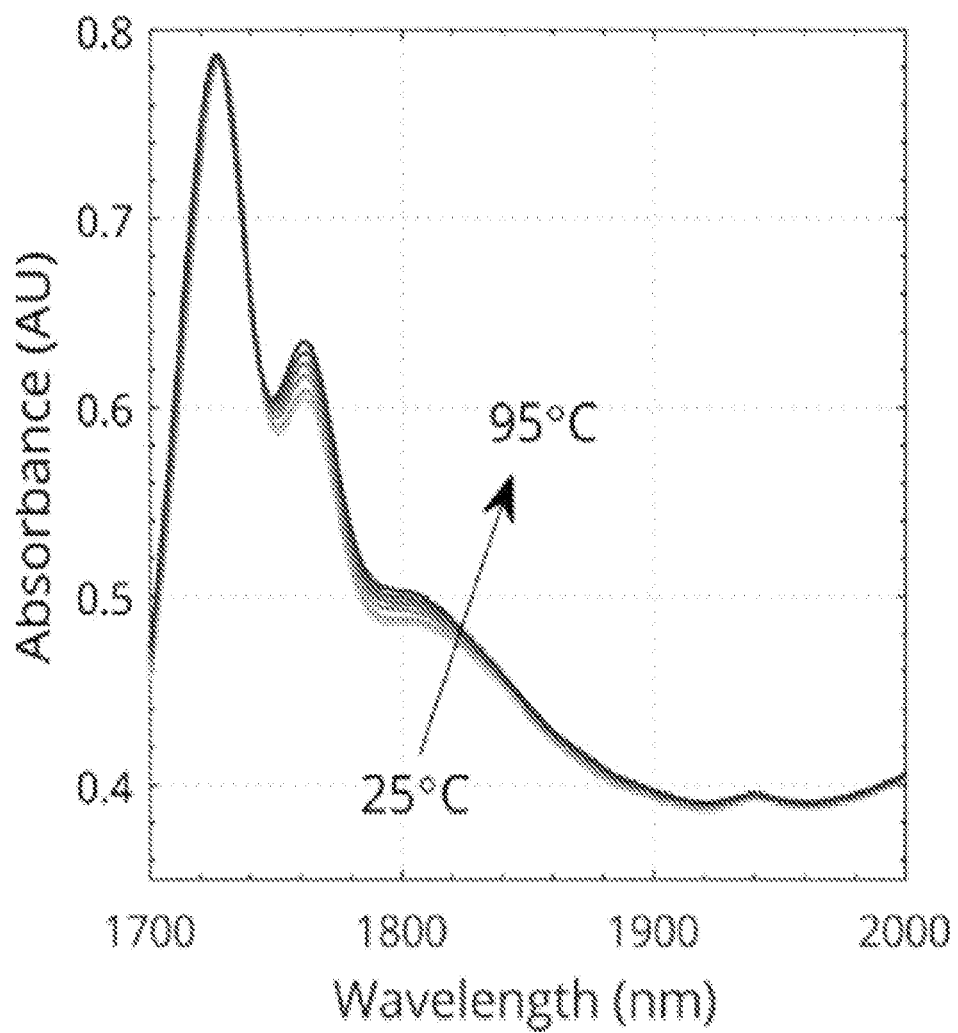
FIG. 3C is data of the effect of temperature on the absorbance of EVA9100.
Figure 3D:
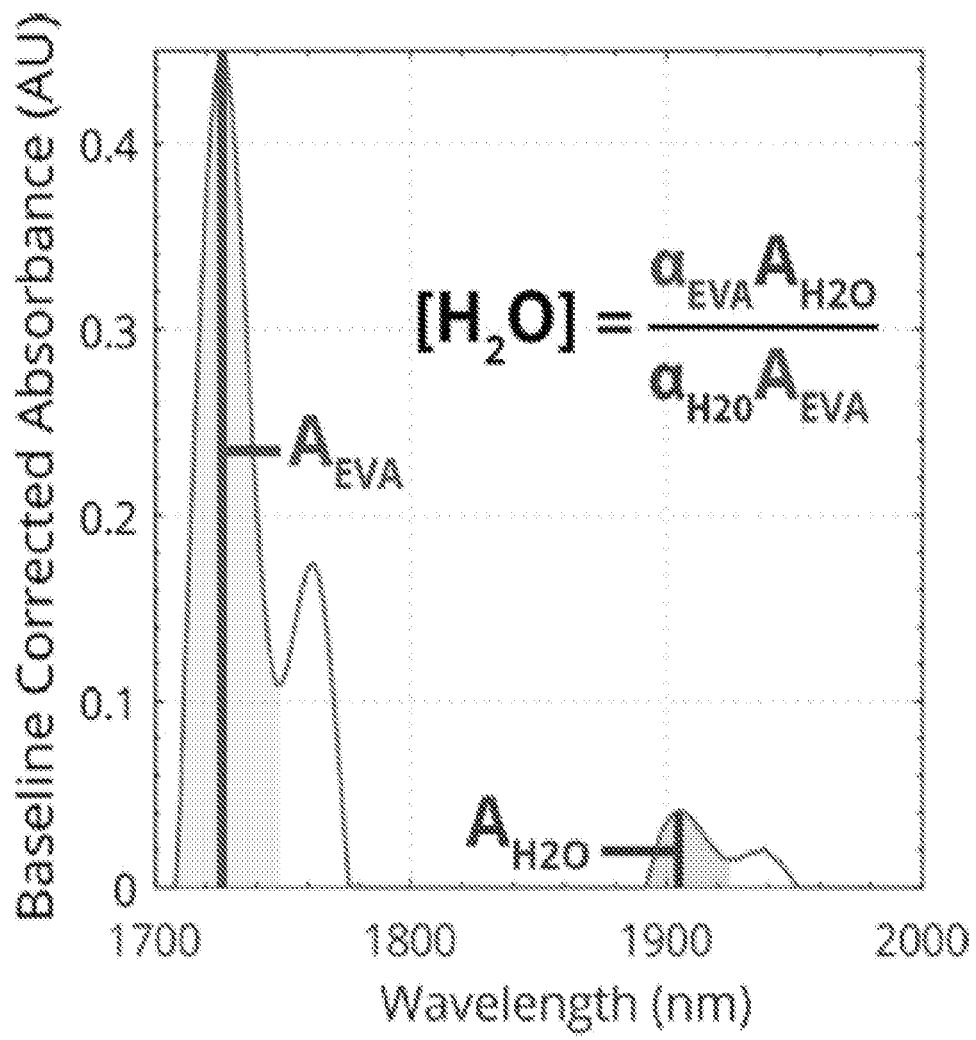
FIG. 3D is a baseline-corrected absorbance spectrum, from which the ratio of the 1902 nm water combination band and the 1730 nm EVA C—H stretching overtone absorbances is used to quantify module water content.

FIG. 3A is data of water and EVA absorption features of interest in a module containing water. FIG. 3B is the absorption spectra of an EVA9100-laminated "open-face" PERC module previously saturated with water at 85° C. 85% RH equilibrating to room conditions. FIG. 3C is data of the effect of temperature on the absorbance of EVA9100. FIG. 3D is a baseline-corrected absorbance spectrum, from which the ratio of the 1902 nm water combination band and the 1730 nm EVA C—H stretching overtone absorbances is used to quantify module water content.

The subtracted baseline is estimated by smoothing the absorbance spectrum with a 102-nm-wide first-order Savitsky-Golay filter. See, A. Savitsky and M. J. Golay, "Smoothing and differentiation of data by simplified least squares procedures," *Anal. Chem.*, vol. 36, pp. 1627-1638, 1964. This subtraction isolates absorbance changes due to water uptake, and removes architectural dependence on the absorption spectrum. FIG. 3A shows assignment of the absorption features for EVA and water in the 1700-2000 nm range. These are the strongest features present within the module reflectance SWIR window and are used to determine the amount of water within the encapsulant. FIG. 3B shows absorbance spectra for an "open-face" (no top glass) EVA9100-laminated PERC module with various water concentrations. The "open-face" module was brought to a water-saturated state by environmental conditioning at 85° C. 85% RH, then optically measured over time at room conditions. Due to the lack of top glass, the water content in the encapsulant rapidly decreases by out-diffusion until the equilibrium water content of room condition has been reached. The influence of water content on front-side module SWIR reflectance is clearly isolated to 1850-2000 nm. This spectral region contains a combination band (1902 nm) from water and a vinyl acetate carbonyl stretching overtone (1940 nm) from the EVA encapsulant. As expected, the absorbance at the water combination band is positively correlated to module water content, as apparent in FIG. 3B. The strength and position of the 1720, 1760, and 1830 nm absorption features are unchanged with varied water content. These features are attributed to higher order C—H and C—H$_2$ vibrational modes in the nonpolar ethylene units of EVA, which should not exhibit strong interaction with any neighboring water molecules, which explains that these features are unaffected by water content. The carbonyl group of the vinyl acetate, being prone to hydrogen bonding with water, is affected by water in the encapsulant.

The front-side reflectance signal is also affected by module temperature. Measurements of dry EVA9100 at various temperatures are shown in FIG. 3C. The absorbances of two ethylene vibrations (1760 nm C—H stretching overtone and 1830 nm combination band) are seen to increase with temperature. The 1730 nm ethylene C—H stretching overtone, the 1940 nm vinyl-acetate carbonyl stretching overtone, and the 1902 nm water combination band region are unchanged with temperature. The difference in temperature-dependent behavior between the two C—H stretching overtone peaks may arise from the mix of amorphous and crystalline phases within the EVA. Ethylene groups within EVA exist in both amorphous and orthorhombic crystalline phases, while vinyl acetate groups only exist in amorphous states. Bonds within crystalline regions will experience a gradual change in vibrational freedom with increasing temperature due to partial melting of smaller, less stable crystalline domains, and should exhibit a change in absorbance behavior as a result. Prior publications confirm this temperature-dependent absorbance behavior in polyethylene. See, M. Mizushima, T. Kawamura, K. Takahashi, and K. H. Nitta, "In situ near-infrared spectroscopic studies of the structural changes of polyethylene during melting," *Polym. J.*, vol. 44, pp. 162-166, 2012; S. Watanabe, J. Dybal, K. Tashiro, and Y. Ozaki, "A near-infrared study of thermally induced structural changes in polyethylene crystal," *Polymer*, vol. 47, pp. 2010-2017, 2006. The temperature-sensitive absorption bands can therefore be associated with the degree of crystallinity of the encapsulant.

In the context of SWIR water detection in an encapsulated module, the features of interest are the C—H stretching overtone at 1730 nm and the water combination band at 1902 nm—these spectral regions display consistent behavior across the relevant range of environmental conditions and provide a robust basis for quantifying water content in modules.

By Beer's Law, the magnitude of the water absorbance, $A_{1902}$, is directly proportional to the concentration of water in the optical path, which consists of two passes through the glass, top encapsulating layer and solar cell. To determine the water concentration, the optical path length must be accounted for. Given that water is insoluble in the glass and cell, the relevant optical path length for water absorption is taken to be twice the encapsulant thickness, $t_{enc}$. This is also the relevant path length for the 1730 nm encapsulant absorption feature, $A_{170}$, the magnitude of which is proportional to the encapsulant thickness. By taking the ratio of water absorbance to encapsulant absorbance, the effect of path length on absorbance can be removed without prior knowledge of the encapsulant thickness. This treatment [see (2)] yields a value proportional to the water concentration (g/cm$^3$) in the encapsulant by a constant factor of the ratio of feature absorption coefficients, a, which can be accessed from the literature or calibrated in test samples.

$$A_{1902} = \alpha_{1902}[H_2O](2t_{enc})$$

$$A_{1730} = \alpha_{1730}(2t_{enc})$$

$$[H_2O] = \frac{\alpha_{1730}A_{1902}}{\alpha_{1902}A_{1730}}$$

Calibration and Detection Limits.

Figure 4A:
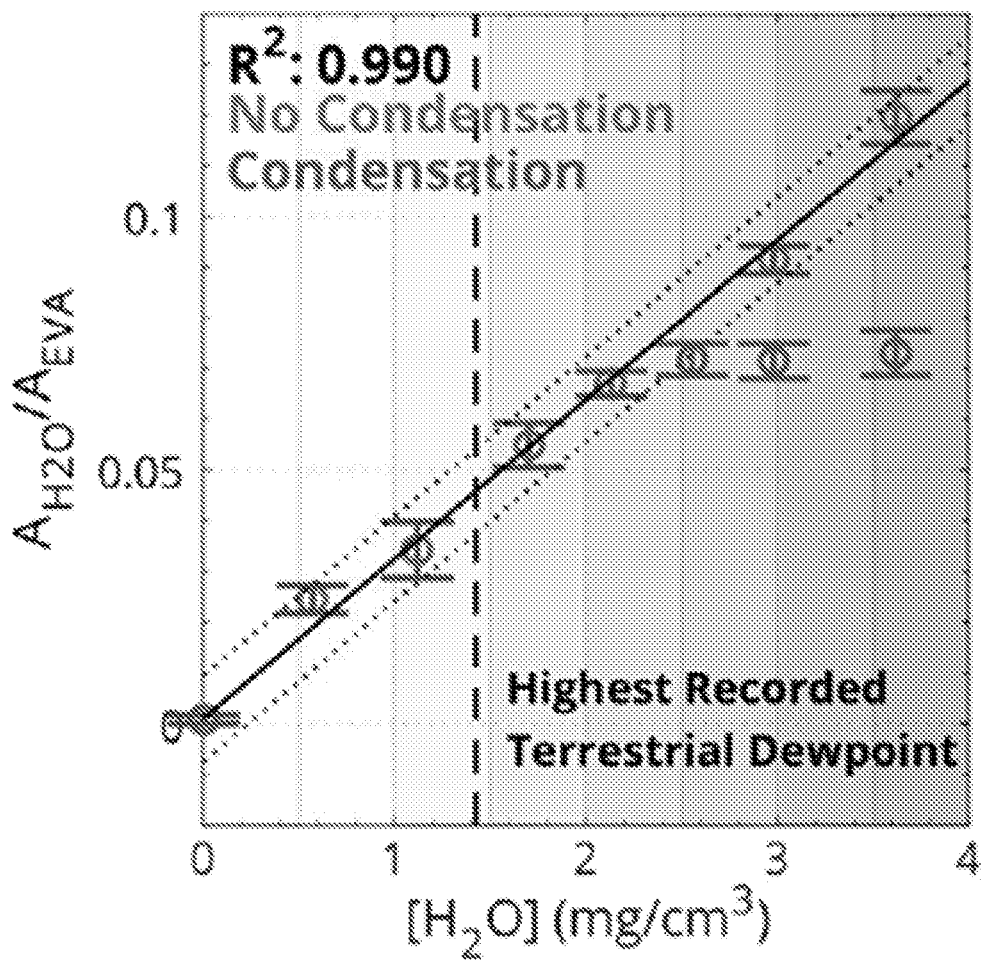
FIG. 4A shows a calibration curve for converting the ratio of water and EVA absorbances to module water concentration.
Figure 4B:
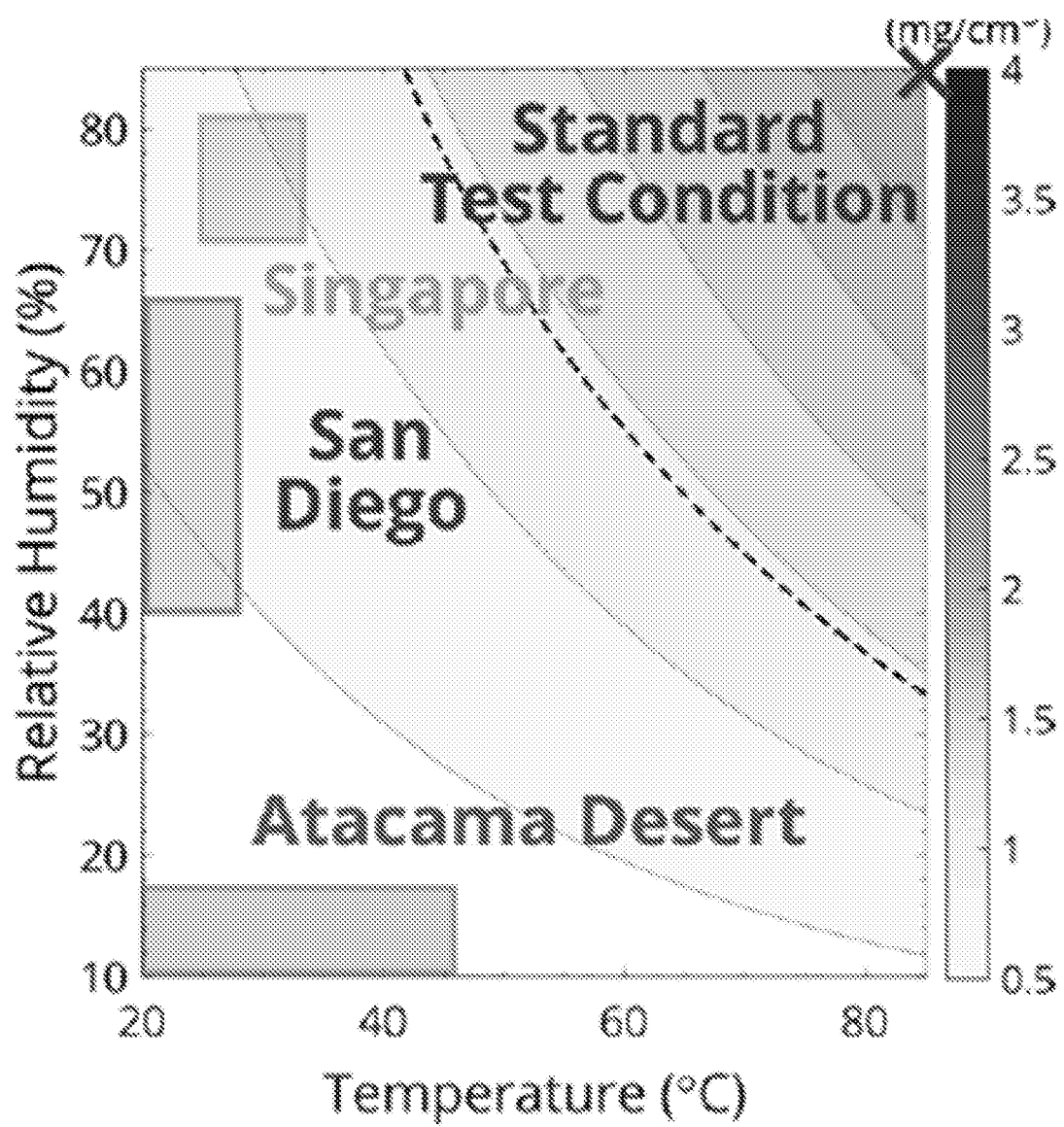
FIG. 4B shows equilibrium water concentration in EVA as a function of environmental condition, along with representative climates and test conditions.
Figure 4C:
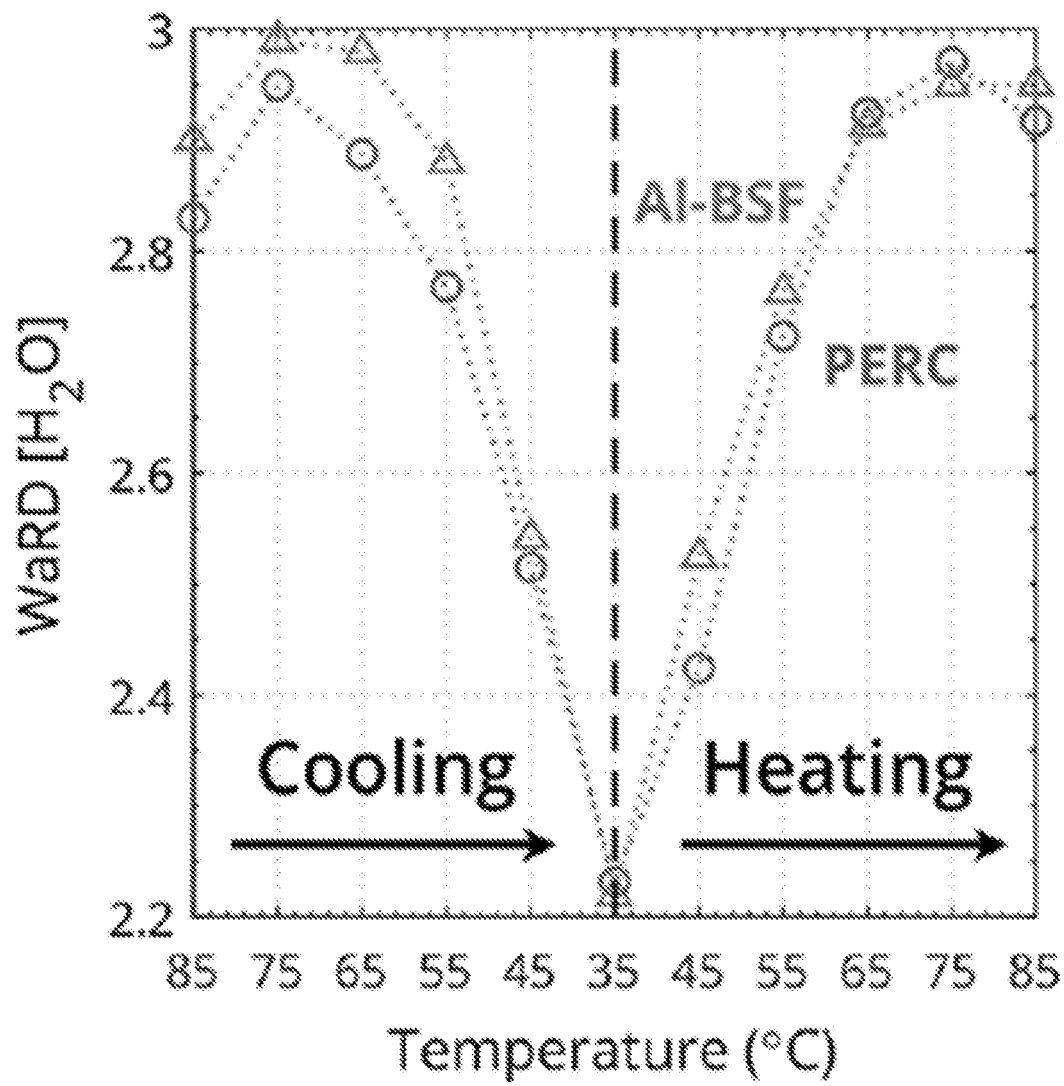
FIG. 4C shows the effect of condensation on the water content measured by WaRD in a saturated sample as a function of module temperature.

FIG. 4A shows a calibration curve for converting the ratio of water and EVA absorbances to module water concentration. Samples for which room temperature condensation was observed either visually or spectrally are shown in red and are not included in the best-fit line. FIG. 4B shows equilibrium water concentration in EVA as a function of environmental condition, along with representative climates and test conditions. FIGS. 4A and 4B share contour lines demarcating encapsulant saturation water concentration in 0.5 mg/cm3 intervals, as well as a dashed line indicating the equilibrium water content expected in EVA at record terrestrial conditions. FIG. 4C shows the effect of condensation on the water content measured by WaRD in a saturated sample as a function of module temperature.

FIG. 4A relates the ratio of the 1730 nm EVA and 1902 nm water absorption features to the module water concentration as determined by Equation (2). Each point contains measurements of 6-12 modules, half-PERC and half-Al—BSF. The performance is consistent across the investigated module architectures and environmental conditions, with sample to sample variation of 0.095 mg/cm$^3$. The accuracy, as determined by the root mean squared error, is 0.130 mg/cm$^3$. The detection limit, as defined by 3.3 times the instrumental noise is 0.066 mg/cm$^3$. The instrumental noise of our benchtop spectrophotometer is taken as the standard deviation of three repeated measurements of a Spectralon reflectance standard. FIG. 4B shows the saturation water concentration in EVA9100 as a function of temperature and relative humidity. The detection method is demonstrated for water concentrations representative of climate conditions ranging from extreme terrestrial conditions, such as the Atacama Desert and Singapore, to the standard 85° C., 85% RH test condition.

We observe optical effects from water condensation within modules conditioned at high temperature and humidity but measured at room temperature and humidity. When the module temperature is brought sufficiently below that of its previous environmental condition, the water in the supersaturated encapsulant condenses into water droplets within the module. This effect can be seen visually when edge-illuminating a module with condensation, as light scattering from the condensed water droplets will generate a hazy appearance. The high-water content (>2 g/cm$^3$) in FIG. 4A modules taken at room conditions demonstrates the effect of condensation on the detection method. When the same modules are measured at their saturation temperature, the extracted water concentration from applying the method matches the expected value. Upon cycling the temperature of a highly saturated module between room temperature and the saturation temperature, the water content measured by the method will decrease during cooling and increase during heating due to condensation and dissolution of water within the encapsulant. An example of this is seen in FIG. 4D in which a module saturated at 85° C., 85% RH was subsequently measured at 10° C. intervals while first cooling from 85 to 35° C., then reheating to 85° C. Samples were held at each temperature for 5 min before measurement. The effect of temperature is completely reversible, indicating that condensation within the encapsulant is reversible and kinetically favorable enough to occur on the timescale of minutes.

Deviation between the generally horizontal data points and the linearly increasing set of points sets a maximum water concentration when applying the method at room temperature: above expected water concentrations of 2 mg/cm$^3$, the module must be measured at elevated temperature to generate an accurate value for water content. In practice this limit will only be passed in aggressive laboratory damp heat testing, as can be seen in FIG. 4B. Even at the highest recorded terrestrial dew point (35° C. in Dhahran, Saudi Arabia on Jul. 8, 2003), module water content would be below the 2 mg/cm$^3$ condensation threshold. In preliminary tests of the measurement artifact introduced by light scattering from condensed water droplets, modules saturated at 85° C. 85% RH and measured at room temperature display an average increase in visible light reflectance of 3%. This increased reflection suggests that light scattering from water condensation may accordingly reduce the short circuit current of modules that are exposed to the standard 85° C. 85% RH damp heat condition but tested at room temperature. Testing of EVA-encapsulated modules saturated at conditions with a dew point greater than 52° C. should be carried out at the saturation temperature to avoid light scattering effects from condensation—otherwise, possible artificial optical losses introduced by water condensation may need to be accounted for.

The precision and accuracy of the experimental methods were based on a reflectance signal with standard deviation of 0.03%. The intensity needed to achieve this depends on the detection hardware. Generally, it is preferably to provide a signal-to-noise ratio (as defined by standard deviation/mean of measured reflectance) of at least 3800.

Spatial Mapping or Imaging of Module Water Content.

Figure 5A:
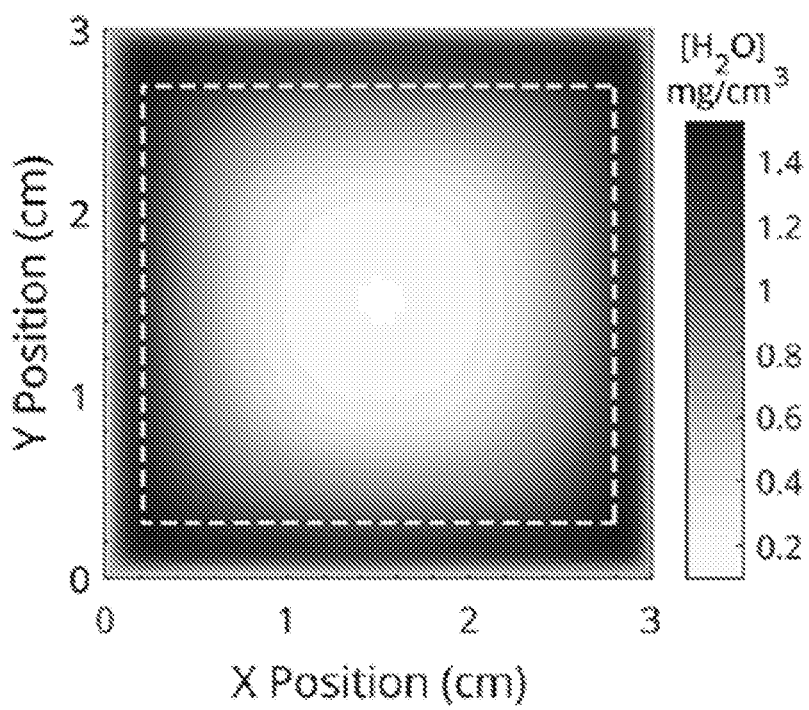
FIG. 5A is a plot of expected water concentration profile in a 3 by 3 cm area EVA-encapsulated PERC module after 18 h exposure to 85° C., 40% RH.
Figure 5B:
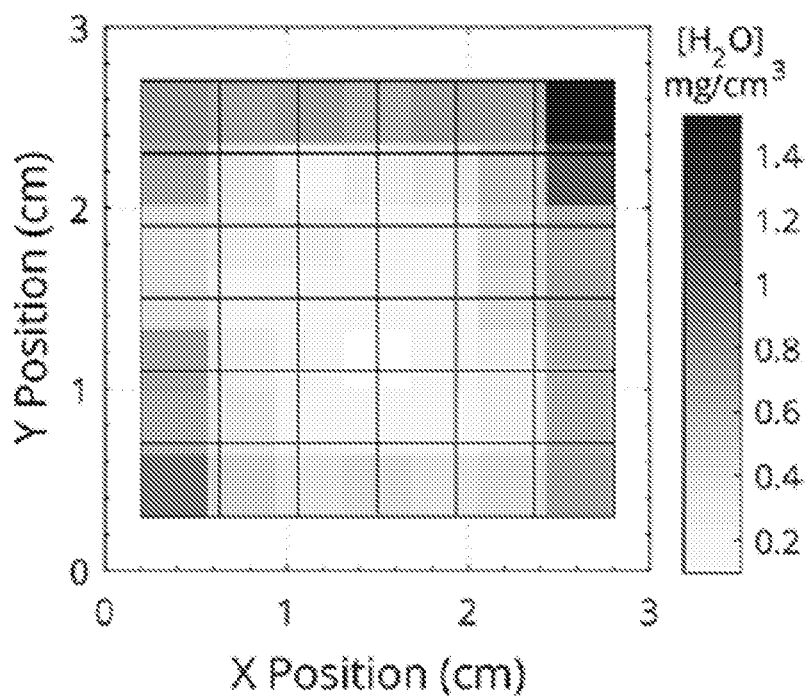
FIG. 5B shows the actual concentration profile determined by the present method in a test module exposed to the modeled environmental condition.

Preferred methods include mapping, enabling spatial quantification of water content across a module. FIG. 5A is a plot of expected water concentration profile in a 3 by 3 cm area EVA-encapsulated PERC module after 18 h exposure to 85° C., 40% RH; FIG. 5B shows the actual concentration profile determined by the present method in a test module exposed to the modeled environmental condition. The area mapped in FIG. 5B is indicated by the white dotted line The FIG. 5A map was determined by finite-element modeling of moisture in-diffusion into the module using the previously parametrized diffusivity and solubility values for EVA9100. The 3 by 3 cm EVA9100-encapsulated PERC module was exposed to 85° C., 40% RH for 18 h after being kept dry in a vacuum oven. Spatial water content was measured by exciting and taking reflectivity measurement using a 7-by-7 grid across the module, indicated by the grid intersection points FIG. 5B. Measurements could not be taken at the edges of the cell due to the large 1 cm spot size of the spectrophotometer used for mapping. The measured concentration profile mirrors the expected profile quite closely, both in the position of the in-diffusion front and the range of water concentrations present across the module. By combining the quantification method presented here with SWIR imaging and using appropriate optical filtering, the point-by-point mapping technique can be extended to a camera-based methodology for high throughput large-area water content imaging of full-size modules.

The Method Applied to Other Encapsulants.

The present method is applicable to any encapsulant material that satisfies two criteria. First, the encapsulant should not have any strongly overlapping absorption features with the water absorption feature of interest, ensuring that any change in absorbance due to water can be clearly observed. Second, the encapsulant should have a characteristic absorbance that is stable across the relevant range of temperatures and water contents by which the optical path length can be estimated. While the present method has been validated using 3M EVA9100, preliminary measurements of dry and water-saturated 3M EVA9110 and Cybrid POE-T have been made to probe their absorbance behavior.

Figure 6A:
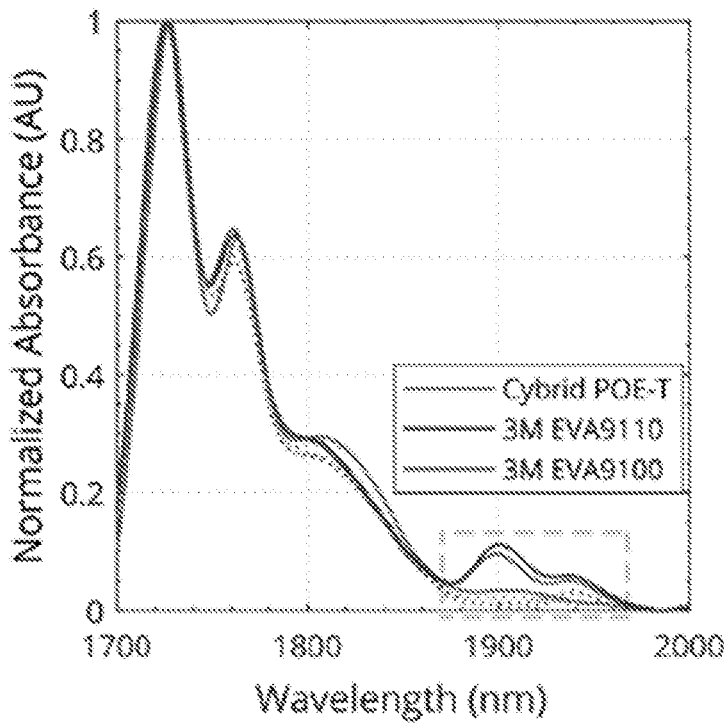
FIG. 6A contains absorbance curves of 3M EVA9100, 3M EVA9110, and Cybrid POE-T encapsulants; FIG. GB shows the FIG. 6A data focused on the spectral region containing the 1902 nm water absorption feature.
Figure 6B:
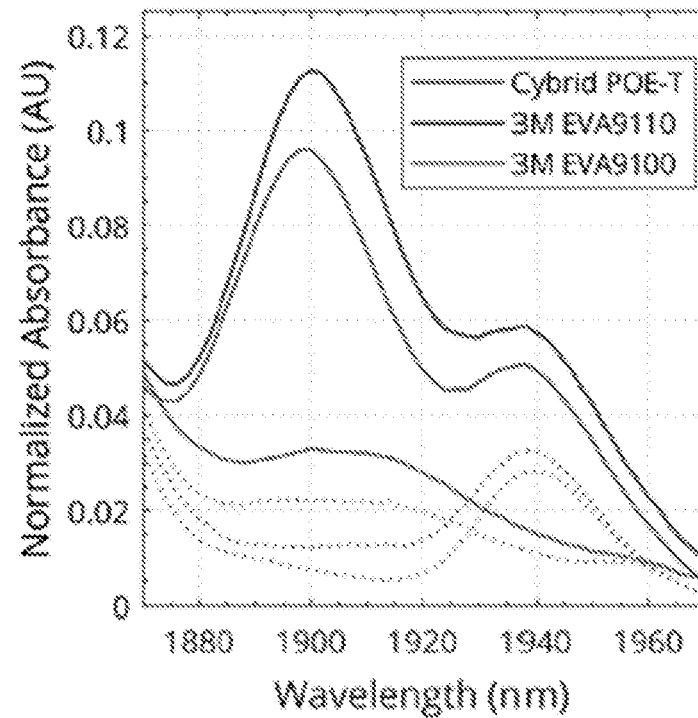

FIG. 6A contains absorbance curves of 3M EVA9100, 3M EVA9110, and Cybrid POE-T encapsulants. Samples were measured in both dry (dotted line) and saturated (solid line) states. FIG. 6B shows the FIG. 6A data focused on the spectral region containing the 1902 nm water absorption feature. Laminated samples of each encapsulant were either dried under vacuum at 50° C. or saturated in a water bath at 85° C. before optical measurements were taken. The dry and saturated measurements show distinct absorption at the water combination band with the 1730 nm C—H overtone remaining constant. Thus, 3M EVA9110 and Cybrid POE-T satisfy the two criteria laid out above, indicating that the present method can be applied to these encapsulants as well. Water content quantification in polyolefins is more difficult simply due to their low moisture capacity, though this can be addressed by purpose-built hardware to provide a higher laser flux, which produces a higher signal. In addition, a parabolic or ellipsoidal mirror has higher throughput than an integrating sphere.

Two-Color Method.

Using two-color excitation only requires a single reflectance spectra to determine water content. The use of an encapsulant absorption feature to normalize the water signal removes the need to know encapsulant layer thickness. Finally, the use of an absorbance ratio for water content determination makes the two-color method robust to local variation in signal intensity. For example, in a two-color method of the invention, the dependence of measurement upon encapsulant thickness can be removed. Variations in the encapsulant thickness, which would affect the absolute signal of water by modulating the optical path length, are accounted for to yield an accurate measure of water concentration within the module. Specifically, the encapsulant thickness is captured at 1730 (+/−2) nm, and the water absorbance is captured at 1902 (+/−2) nm. Taking the ratio of these values makes the measurement independent of the encapsulant thickness, which may not be known to a sufficient degree of accuracy. In a preferred system and method, the light source 102 is pulsed light source having multiple lasers operated at different wavelengths, e.g., 1730 (+/−2) nm 1902 (+/−2) nm. In addition, the electronic analysis simultaneously collect absorbance spectra at the two different wavelengths, and the ratio can be determined.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. Various features of the invention are set forth in the appended claims.

The invention claimed is:

1. A method for moisture testing of a fully assembled photovoltaic (PV) module, comprising:
   probing the assembled PV module with pulsed short wave IR probe energy in the range of 1700-2000 nm, wherein the short wave IR probe energy is pulsed according to a reference signal;
   collecting energy reflected from the assembled PV module and directing the energy to a sensor;
   integrating a reflectance signal from the sensor with the reference signal over a time period sufficient to average out signals out of phase with the reference signal and provide an absorption signal;
   analyzing the absorption signal to determine the presence or absence of moisture.

2. The method of claim 1, wherein analyzing is conducted with a narrow pass band of 5 nm or less applied to a selection of individual wavelengths in the range of 1700-2000 nm.

3. The method of claim 2, wherein said analyzing comprises setting an optical path length for water absorption as twice a thickness of an encapsulate layer of the PV module.

4. The method of claim 1, wherein the probe energy is pulsed energy having a wavelength of 1730 nm+/−5 nm.

5. The method of claim 1, wherein the sensor is an InGaAs photodetector.

6. The method of claim 1, wherein said collecting comprises collecting with one of an integrating sphere, ellipsoidal or parabolic collection optics and a high numerical aperture collective lens.

7. The method of claim 1, wherein said collecting comprises sensing the C—H stretching overtone at 1730 nm and the water combination band at 1902 nm and said analyzing analyzes absorption at those bands to quantify water content.

8. The method of claim 1, wherein said analyzing comprises determining a ratio of water absorbance to encapsulant absorbance, to remove the effect of path length on absorbance without prior knowledge of the encapsulant thickness.

9. The method of claim 1, wherein said analyzing comprises spatially mapping moisture content in the assembled PV module.

10. A system for moisture testing of a fully assembled photovoltaic (PV) module, comprising:
    a function generator for generate a pulsed reference signal;
    a pulsed light source responsive to the pulsed reference signal to emit probe energy in the range of 1700-2000 nm;
    optics to direct the probe energy upon the assembled PV module;
    optics to collect reflected energy from the assembled PV module;
    a sensor receiving collected reflected energy and generating a reflectance signal;
    a lock-in amplifier locked to the pulsed reference signal to attenuate noise in the collected reflected energy by integrating the reflectance signal with the reference signal over a time period sufficient to average out signals out of phase with the reference signal to provide an absorption signal; and
    electronic analysis of the absorption signal to determine whether moisture is indicated by the absorption signal.

11. The system of claim 10, wherein the pulsed light source comprises multiple lasers operated at different wavelengths and the electronic analysis analyzes the absorption signal at the different wavelengths.

12. The system of claim 11, wherein different wavelengths are 1730 (+/−2) nm 1902 (+/−2) nm.

13. The system of claim 11, wherein the pulsed light source is a narrow band (+/−5) nm source.

14. The system of claim 10 wherein the optics to collect comprise an integrating sphere that collects a diffuse component of the reflection spectrum.

* * * * *